United States Patent [19]
Muller et al.

[11] 3,934,563
[45] Jan. 27, 1976

[54] SPEED-DEPENDENT IGNITION ANGLE CONTROL

[75] Inventors: Rudolf Müller, Hannover-Stocken; Jürgen Decker, Berenbostel, both of Germany

[73] Assignee: Volkswagenwerk Aktiengesellschaft, Wolfsburg, Germany

[22] Filed: May 10, 1974

[21] Appl. No.: 469,007

[30] Foreign Application Priority Data
May 19, 1973  Germany............................ 2325497

[52] U.S. Cl............................ 123/117 R; 123/117 D
[51] Int. Cl.²............................................ F02P 5/04
[58] Field of Search ..................... 123/117 R, 148 E

[56]  References Cited
UNITED STATES PATENTS

| | | | |
|---|---|---|---|
| 3,454,871 | 7/1969 | Nolting ........................... | 123/117 R |
| 3,696,303 | 10/1972 | Hartig ............................. | 123/148 E |
| 3,738,339 | 6/1973 | Huntzinger et al. ............ | 123/117 R |
| 3,752,139 | 8/1973 | Asplund .......................... | 123/117 R |
| 3,757,755 | 9/1973 | Carner ............................ | 123/148 E |
| 3,799,136 | 3/1974 | Korteling ........................ | 123/117 R |
| 3,830,207 | 8/1974 | Joseph............................. | 123/148 E |

*Primary Examiner*—Charles J. Myhre
*Assistant Examiner*—J. Cangelosi
*Attorney, Agent, or Firm*—Brumbaugh, Graves, Donohue & Raymond

[57]  ABSTRACT

A method and an apparatus for speed-dependent control of the ignition angle of an internal combustion engine with external ignition includes markings on a rotating element of the engine, and receiving elements associated with such markings which control an integrator within a predetermined interval by an electric signal. An accurately timed ignition signal is obtained from the integration result present at the end of the interval.

18 Claims, 8 Drawing Figures

SPEED-DEPENDENT IGNITION ANGLE CONTROL

BACKGROUND OF THE INVENTION

This invention relates to a solution of the problem of control of the instant of ignition, and thereby the ignition angle, measured in relation to a fixed reference point in time, usually top dead center in an internal combustion piston engine. The solution of this problem is important, not only in the context of satisfactory functioning of the internal combustion engine, but also for decreasing the proportion of noxious substances in the exhaust gases of the engine.

One known approach to the solution of this problem operates digitally thereby avoiding additional mechanical adjustment elements, such as centrifugal governors. This approach, disclosed in U.S. Pat. No. 3,696,303 utilizes two pulse trains which are produced synchronously with the periodic revolutions of an element of the internal combustion engine. These two pulse trains are generated by means of a rotating toothed disk. The pulses of one pulse sequence are stored during a predetermined time interval so that, at the end of such time interval, there is stored (as an integration reault in a counter) a pulse number which is proportional to the speed of revolution of the engine. The pulses of the second pulse sequence, likewise synchronous with the rotation of the element of the engine, are counted and stored until a predetermined sum value is attained for the two stored pulse numbers. As soon as this predetermined sum value is attained, the known method produces an accurately timed ignition signal.

With this known method, it is not feasible, at least without considerable expenditure, to achieve a non-linear functional relation between the ignition angle and the speed of revolution of the internal combustion engine. This disadvantage is avoided by a method in accordance with the invention which is characterized in that the predetermined interval is a constant angle interval extending between a first and a second marking, and in that the electric quantity and/or the integration constant of the integrator is varied speed-dependently to achieve a non-linear dependence of the ignition angle on the speed.

A first essential characteristic of the invention may be found in the fact that unlike the state of the art dealt with above, it does not use a constant time interval, but rather uses a constant angle interval. Accordingly, the integration result is inversely proportional to the specific speed of the engine. If a digital arrangement, i.e., an arrangement operating with pulses, is used to execute the method in accordance with the invention, the rotating element of the engine need not be supplied with means for pulse generation, such as teeth, but only with markings defining the constant angle interval. Another characteristic, made possible only by the first essential characteristic, consists in that, generally speaking, the integration process during the constant angle interval is controlled as a function of engine speed. In an analog method in accordance with the invention, the integrator is controlled by an electric voltage whose amplitude is varied for given speed values. Moreover, it is also possible to obtain by means of these given speed values (which would have to be rapidly determined, e.g., by means of a tachometer) the signals to switch the integration constant of the integrator within the integrator circuit.

Another possibility of the method in accordance with the invention provides that the integrator is a pulse counter and operates on a pulse train produced outside the engine whose frequency is modified as the number of pulses within the angle interval increases. Accordingly, as soon as the pulse number stored in the pulse counter during the fixed angle interval attains a given value, switching to a higher frequency occurs. The position and the extent of these sudden changes of frequency or frequency steps determines the non-linear function by which the rotational speed influences the ignition angle. In the final analysis, an approximation of the non-linear shape of this curve is a polygon.

As a rule, the optimum ignition angle is a function, not only of the speed of revolution of the engine, but is also a function of the engine load. This load dependency can be taken into account in accordance with the invention by taking the difference between the integration result and a load-dependent signal, and producing the ignition signal when the difference assumes a given value. To this effect, following termination of the angle interval, the integrator can be discharged at a constant rate which is independent of the rotational speed, and the ignition signal can be generated on comparison of the storage value of the integrator with the load-dependent signal. This variant of the method in accordance with the invention is likewise applicable for an analog as well as digital embodiment for practicing the method. The speed-independent time constant can be achieved, e.g., in a digitally operated embodiment, by causing the pulse counter to count pulses of a constant frequency in a backward counting direction.

As we have seen, taking into account the functional relation of the ignition angle and the speed of the engine, the invention provides for an approximation of the non-linear shape by a polygon curve. In accordance with a further development of the invention, the correction required by the effect of engine load on the optimum ignition angle is made by providing a load-dependent signal which is modified in steps by a load sensor. Each of the steps causes a modification of the adjustment of the ignition angle by the same value. In this effect, an additional integrator can be controlled in the angle interval by a further electric quantity and the latter and/or the integration constant can be modified by a load sensor. In such a case, the integration result of the second integrator at the end of the angle interval is used as a load-dependent signal. Here again, the method can be executed with simple means by both an analog and a digital arrangement. For example, in an analog solution, the second integrator is controlled by an additional electric voltage, the amplitude of which is varied for given load values. Moreover, the additional integrator can also be an additional pulse sequence generated outside the engine whose frequency is modified when given load values are reached within the angle interval. These sudden changes in frequency occur, as in the case of the frequency changes produced by engine speed changes, to produce an actual ignition angle-engine load curve formed of straight line segments whhich approximates the ideal shape of the curve of the functional relation of the ignition angle and the engine load.

The arrangement in accordance with the invention for execution of the method, independent of whether the arrangement functions analoguely or digitally, is characterized in that the rotating element of the engine is provided with two markings angularly displaced to define the angle interval. The position of the markings are defined in relation to the positions of the element at a given operating phase of such element which, for a piston engine, is preferably at top dead center. With the engine running, the markings pass the stationary receivers or pick-ups designed as proximity switches in a time interval inversely proportional to the rotational speed. In this way, control signals are generated in the pick-ups for the connected integrators which are provided in a number and arrangement determined by the number of different ignition points of the engine. At this point, it becomes quite clear that the invention avoids pulse-generating elements, e.g., a toothed disk, driven by the internal combustion engine. Rather, it is merely necessary to provide markings on a rotating element of the engine which, while rotating, pass stationary pick-ups. As these markings pass these stationary pick-ups, they produce pulses or signals which, in turn, initiate or terminate the delivery of electrical quantities to the integrators. The markings can be obtained in a simple manner by local modifications of material, e.g., pins or holes, in the rotating element of the engine. For example, the markings can be provided on the flywheel of the engine while the pick-ups are located on the gear box flange and on the crankcase of the engine. Suitably, the markings and the pick-ups will be arranged on the same radius. The fact that only a small number of markings is required, two markings are sufficient to define the constant angle interval, makes unnecessary a reconstruction of available engine parts in order to form the markings. Nor need there be provided any additional moving parts, such as a toothed disk. This is all the more true because the markings, such as indicated above, can be obtained in a simple manner by local material modifications.

In accordance with the preferred embodiment of the invention, the aforementioned two markings are arranged, insofar as a piston engine is concerned, 80° and 40°, respectively, before top dead center in relation to the pick-ups. The number and the arrangement of the pick-ups will depend upon the number of ignition points of the engine. In a four cylinder engine in which two cylinders each are fired simultaneously, two pick-ups will be arranged offset by 90° with respect to top dead center and 180° with respect to each other. In such a case, the markings are associated with each pair of simultaneously firing cylinders.

It may be advisable to include a third marking on the rotating element such that, in case of failure of the other parts of the arrangement, an emergency ignition is brought about, e.g., in a piston engine in top dead center.

A plurality of embodiments for execution of the method in accordance with the invention can be employed. Therefore, the invention is not to be construed as limited to the particular digitally functioning preferred embodiment disclosed.

This preferred embodiment of the invention is characterized in that an oscillator with constant frequency is connected to a first network which steps up or steps down the frequency of the pulses produced by the oscillator. The network feeds a first pulse counter and also receives from it switching signals for producing frequency modifications on attainment of the given pulse numbers. After switching initiated by the control signal produced by the second marking pulses with a constant gating frequency are delivered to the first pulse counter for the purpose of gating the integration result over the first network at a constant rate.

Pulse generation is obtained here by means of oscillators, e.g., a quartz oscillator, so as to ensure the desired precision of the ignition timing within a wide temperature range and over long periods of operation. Mechanical parts subject to wear and tear are avoided, especially since the cooperation of markings and pick-ups occurs without mechanical contact, but merely by the proximity of the markings from the pick-ups.

The modification of the frequency of the pulses delivered to the pulse counter to achieve speed dependence is obtained in a simple manner by switching within the network. These switchings are suitably obtained by electronic switches of known construction.

The influence of the engine load on the optimum ignition angle is achieved by connecting a second network to the oscillator for stepping up or stepping down the frequency of the pulses produced by the oscillator. The second network receives switching signals from the load sensor for producing the frequency variations at the given load values. On the output side, the second network is connected with a second pulse counter. Both pulse counters feed a comparator circuit which produces an ignition signal whenever the integration result in the first pulse counter had been modified to a value which is a function of the load-dependent signal. Accordingly, pulse generation for speed dependence and load dependence occurs in one oscillator and two networks are provided to derive from this single generated pulse frequency the different frequencies required both for achieving rotational speed dependence and load dependence.

In one embodiment of the invention which was tested, an oscillator with a frequency of 1 MHz was found to be useful. The influence of engine speed change on ignition angle is achieved by providing three switchings, namely, at approximately 4000 rpm to 200 kHz, at approximately 1550 rpm, to approximately 500 kHz and at approximately 1150 rpm to approximately 830 kHz. The influence of engine load change on ignition angle is achieved by providing ten steps of 12.5 kHz each. Each frequency step causes a modification of the firing angle by 1° crankshaft angle.

Furthermore, the preferred embodiment of the invention is designed such that the second marking switches the first pulse counter to count backward (for the pulses with the gating frequency) and the comparator circuit produces the firing signal on equality of both pulse counter states. It is possible as a matter of principle to undertake upwards counting with the first pulse counter after completion of the constant angle interval. In this embodiment of the invention, the circuits become especially simple.

DESCRIPTION OF THE DRAWINGS

A preferred embodiment of the invention will be described below with the help of the drawings wherein.

Figure 1:
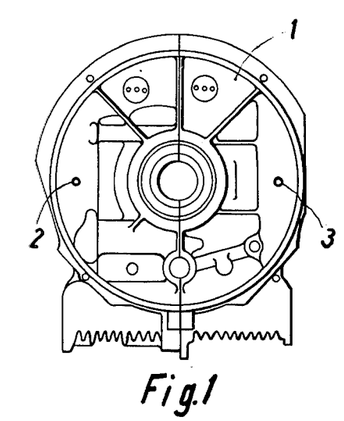
FIG. 1 is an elevation of the gearbox flange side of a crankcase on which two pick-ups are positioned 180° apart.

Viewing initially FIG. 1, the gearbox flange side of the crankcase 1 has two pick-ups 2 and 3 arranged diametrally opposite each other. These pick-ups may be proximity switches which are well known and are therefore not shown in detail. Nor is the crankcase structure illustrated further inasmuch as it is of interest to this invention only as a suitable mounting for the proximity switches.

Figure 2:
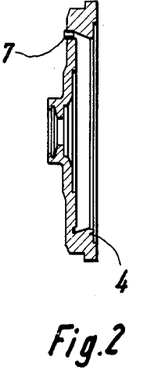
FIG. 2 is a sectional elevation through lines 2—2 in FIG. 3.
Figure 3:
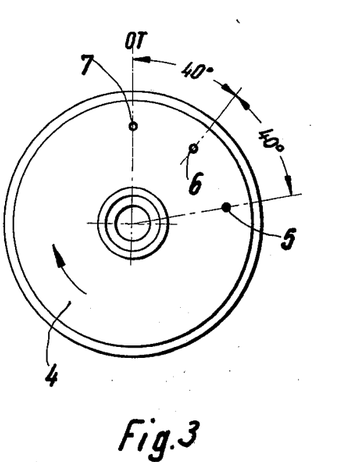
FIG. 3 is an elevation of an engine flywheel on which three marks are positioned.

Looking now at FIGS. 2 and 3, the flywheel 4 of the internal combustion engine carries three markings 5, 6 and 7 at the same radius as the pick-ups 2 and 3. When the engine is running, the markings 5, 6 and 7 pass the pick-ups 2 and 3 in sequence and generate signals therein. The signals are offset with respect to each other by a crankshaft angle of 180° so that they define two ignition points which are likewise offset by a 180° crankshaft angle with respect to each other. Accordingly, the pick-ups 2 and 3 in each case serve to produce ignition signals for cylinders of the engine which are fired at the same point in time.

As shown in FIGS. 2 and 3, the markings 5, 6 and 7 in this example of an embodiment are constituted by pins inserted into the flywheel 4. However, it would also be possible to use holes or cavities as marks in place of the accumulation of material caused locally by the pins in the flywheel 4.

In this embodiment, the markings are displaced from one another by a crankshaft angle of 40° so that marking 5 is placed at 80° and marking 6 at 40° before top dead center. Marking 7 is placed directly on the top dead center angle position. It constitutes an emergency marking with is to cause ignition at TDC in the event that the other parts of the ignition adjustment arrangement should fail.

In the block circuit diagram in FIG. 4, we again find the pick-ups 2 and 3 whereas the markings 5, 6 and 7 are not shown. The signals produced by the markings in the pick-ups 2 and 3 are forwarded over a storage 10 and 11 each to an ignition device 12 and 13, respectively, each one likewise associated individually with only one of the pick-ups. The signals cause triggering of only respective ignition device 12 or 13 associated with that signal.

Figure 4:
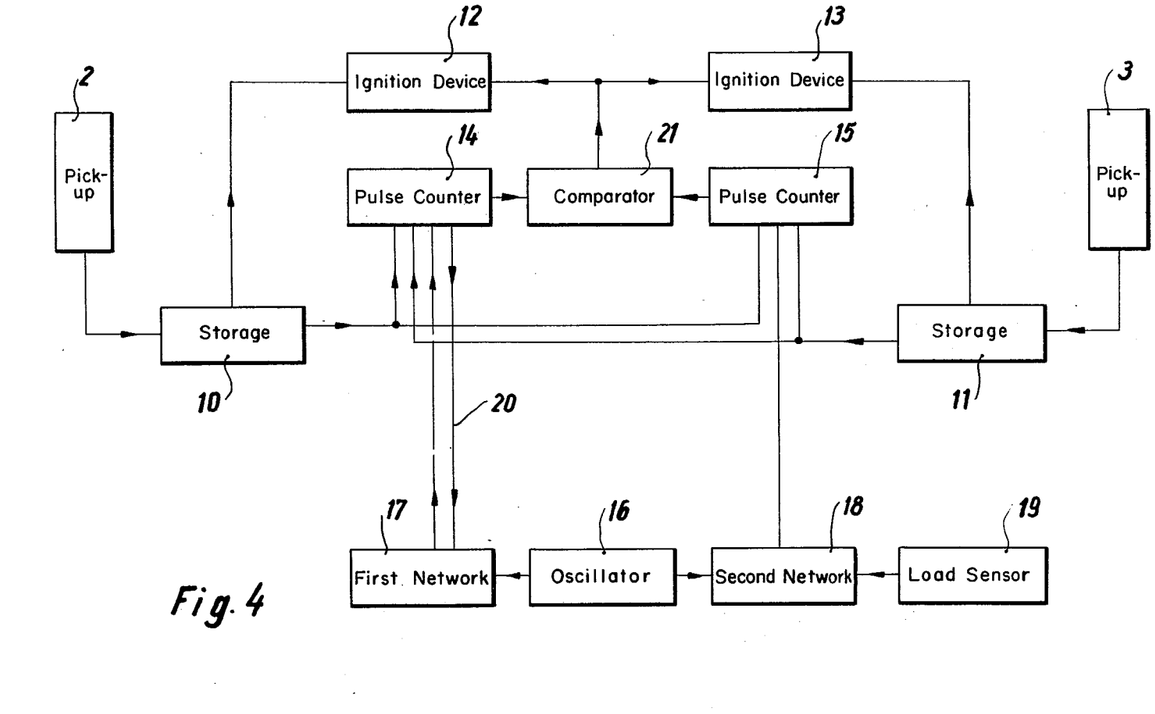
FIG. 4 is a block diagram of a circuit of the preferred embodiment of the invention.

The other elements of the circuit shown in FIG. 4 are associated with both pick-ups 2 and 3 in common. Inasmuch as we are dealing here with a digital arrangement, the integrators are designed as pulse counters. Two pulse counters 14 and 15 are provided here of which the first pulse counter 14 serves to take into account the speed dependence and the second pulse counter 15 serves to take into account the load dependence of the ignition angle. The pulses are generated by a 1 MHz oscillator 16 which is followed by a first network 17 and a second network 18. In this example of an embodiment, the two networks are switchable frequency dividers whereby the first network 17 serves to produce the frequency change taking into account the speed dependence, and the second network 18 serves to produce the frequency change taking into account the load dependence. As indicated by the circuit element 19, the frequency divider 18 is switched by a load sensor known in itself, e.g., a vacuum box in the suction pipe. In contrast thereto, switching in the frequency divider 17, as indicated by the line 20, occurs by way of the first pulse counter 14 associated with it whenever on attainment of a given pulse number by the first pulse counter 14 within the constant angle interval it is indicated that a given rotational speed has been exceeded.

Both counters 14 and 15 count initially within the constant angle interval represented in FIG. 3 by the angle between the two markings 5 and 6. The forward counting of both counters 14 and 15 is terminated by a signal generated in the pick-ups 2 and 3 by the second marking. In the counter 15 no further counting occurs, however, a switching occurs in the first pulse counter 14 to counting backwards with a constant pulse frequency, e.g., 500 kHz, which is obtained by switching in the first frequency divider 17. The pulse numbers stored in each of the counters 14 and 15 are delivered to a comparator circuit 21 which then forwards to the firing devices 12 and 13 the firing signal whenever the backward counting by the pulse counter 14 of the pulses with the constant gating frequency causes the level of the pulse counter 14 to become identical with the counting level of the second pulse counter 15. Accordingly, the ignition angle is determined by the difference between the possibly non-linearly speed-dependent state of the pulse counter 14 and the likewise possibly non-linearly load-dependent counting level of the second pulse counter 15.

At this point, it should be mentioned that additional controlling magnitudes may be added. For example, it is feasible on cold starting to provide, as a function of the engine temperature, for a displacement of the timing characteristic of the ignition angle control in the direction for a delayed or advanced ignition.

Figure 5A:
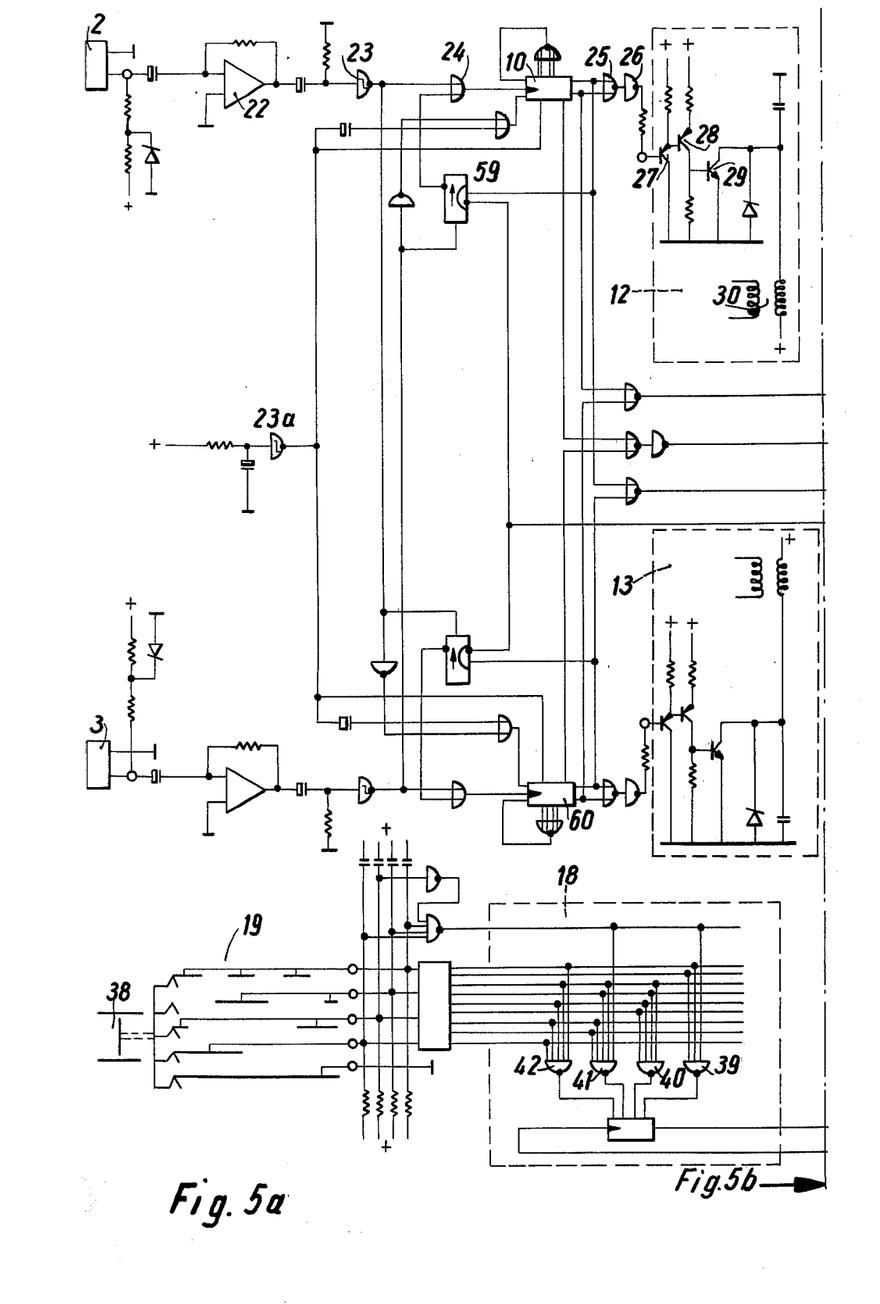
FIGS. 5a and 5b are is a detailed circuit diagram of the circuit outlined in block diagram form in FIG. 4.
Figure 5B:
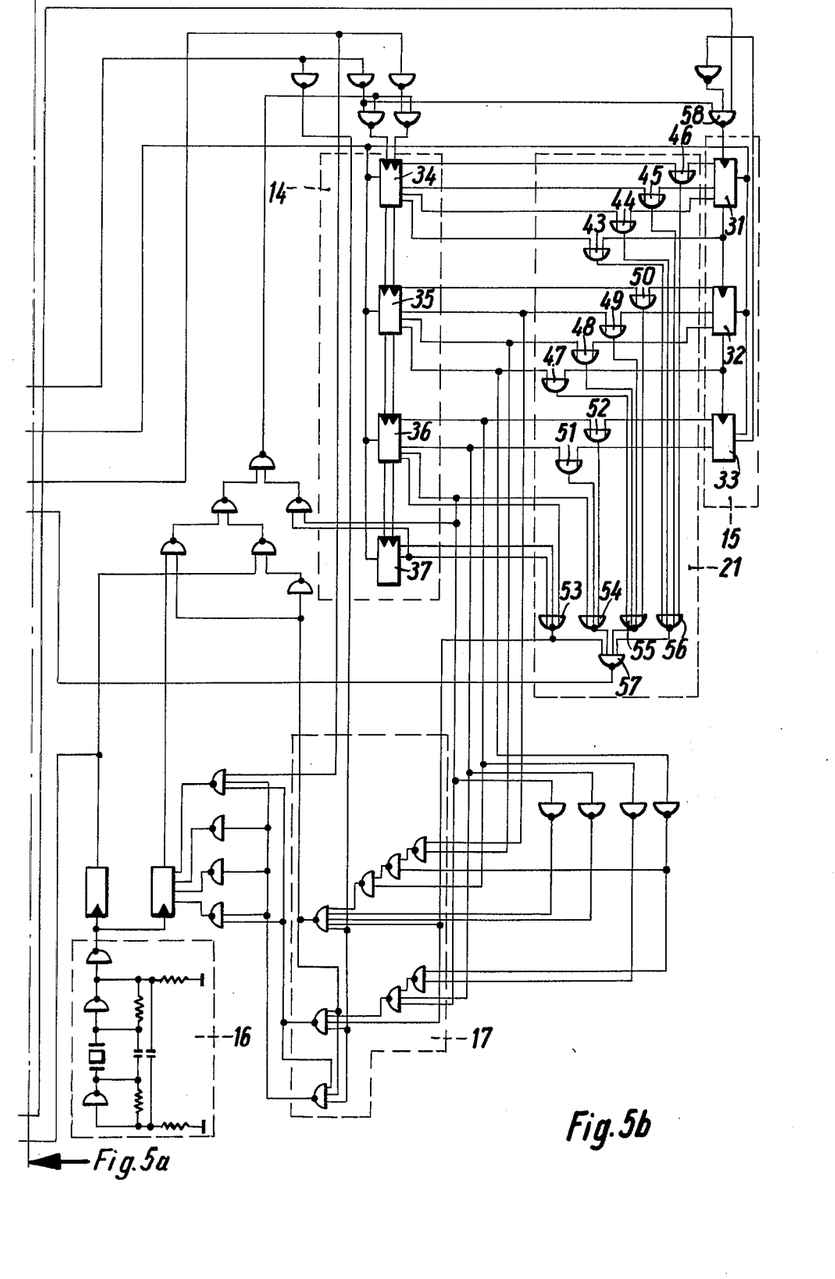

Turning now to the circuit shown in FIGS. 5a and 5b soon as the first marking 5 (see FIG. 3) passes by the pick-up 2, e.g., designed as proximity switch, this pick-up gives off a pulse to an operation amplifier 22 which pulse is forwarded over a Schmidt trigger 23 and an EXCLUSIVE-OR gate 24 to a shift register representing the storage 10. The storage 10 in preparation puts an ignition coil 30 under voltage by way of gates 25 and 26 and the transistors 27, 28 and 29. Counters 34 to 37, constituting the first pulse counter 14, and counters 31, 32 and 33, constituting the second pulse counter 15, have been set back by the last ignition pulse.

At this point, mention should be made only that the other ignition device 13, which is to generate ignition pulses offset by a 180° crank angle with respect to the pulses produced by the ignition coil 30, has a structure identical to that of the ignition device 12.

In this example of an embodiment, the first pulse counter 14 contains four counters, 34 to 37 which are likewise controlled by way of the storage 10 designed as shift register. As soon as the first signal, as mentioned above, has arrived from the pick-up 2, the storage 10 causes pulses with a first frequency to be forwarded into the counters 34 to 37. These pulses are derived from a pulse series obtained in the quartz oscillator 16. As soon as a given pulse number had been reached in the pulse counter 14, a frequency switch occurs by way of the frequency divider 17. The pulses being counted in the first pulse counter 14 are now arriving at a different frequency. As a rule, this frequency switching will occur several times so that the ideal curve is closely approximated by the actual straight line segment curve for the ignition angle obtained as a function of the rotational speed.

After a rotation of the flywheel by a 40° crankshaft angle, the second marking 6 becomes effective and generates a second signal in the proximity switch 2. This signal, too, is forwarded over the operation amplifier 22, the Schmidt trigger 23 in the form of an integrated circuit and the EXCLUSIVE-OR gate 24 to the shift register 10 which now switches the oscillator to the constant gating frequency and at the same time switches the counters 34 to 37 to counting backward.

In order to obtain a load-dependent counting value, a vacuum box 38 connected to the intake manifold actuates the ten step switch 19 operating as per a code. This switch is placed in the control circuit of four gates 39 to 42 which, in turn, form the frequency divider 18. Thus, the frequency of the pulses being delivered to the pulse counter 15 is a function of the specific position of the switch 19. In this way, the influence of engine load on the automatic adjustment of ignition angle is achieved. As explained above, the individual frequencies are chosen in such a manner that each causes a modification of the position of the ignition point by 1 unit of the ignition angle, thus, e.g., 1°.

The working time of the second pulse counter 15 is limited to the constant angle interval. Accordingly, as soon as the second marking 6 (see FIG. 3) has passed the pick-up 2 and generated a signal in it, a second counting in the pulse counter 15 is prevented.

Both pulse counters 14 and 15 feed the comparator circuit 21 which is equipped with several gates, of which the gates 43 to 52 undertake the comparison proper of the stored pulse numbers, and the gates 53 to 58 activate the monoflop 59 whenever the first pulse counter 14, counting backwards, has reached a counting level which is identical with the stored counter level of the second pulse counter 15.

The ignition spark proper is produced when the shift register 10, operating through the transistors 27, 28 and 29, disconnects the voltage from the ignition coil 30.

In the event that electronic ignition breaks down, the marking 7 (see FIG. 3) becomes operative and causes ignition at TDC. In such a case, the shift register 10 (or 60 insofar as the second pick-up 3 is concerned) disconnects the battery voltage from the ignition coil 30 and thereby produces the ignition spark at TDC.

The purpose of the Schmidt trigger 23a is the undertaking of a preprogrammed adjustment of the shift registers 10 and 60 when the pick-ups 2 and 3 are placed between the markings 5, 6 and 7.

Figure 6:
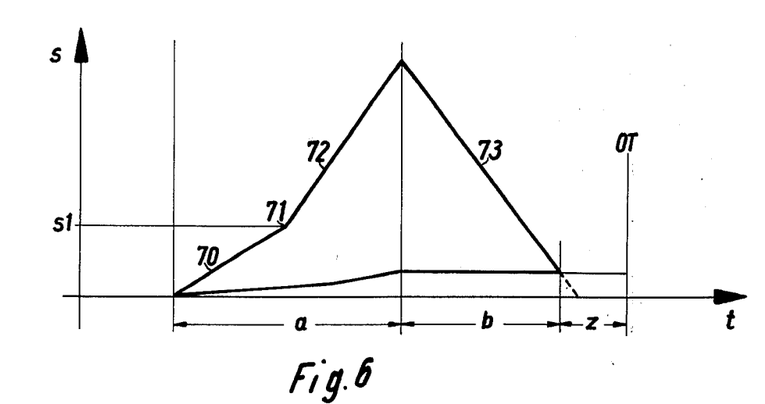
FIG. 6 is a graph showing, in the upper and lower curves, stored pulse numbers in the first and second pulse counter, respectively, plotted against time $t$.
Figure 7:
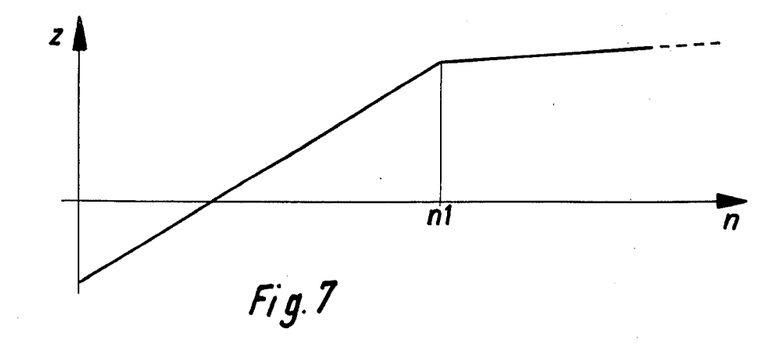
FIG. 7 illustrates the change of the ignition angle $z$ with increasing speed $n$.

If we now view the diagrams in FIGS. 6 and 7, we find that they present a summary of the principle of the invention.

In FIG. 6, the upper curve represents the stored pulse number $s$ in the pulse counter 14, and the lower curve represents the stored pulse number $s$ in the pulse counter 15, both plotted against the time $t$. At a given rotational speed, the constant angle region which is determined by the first two markings 5 and 6 (see FIG. 3) can be represented by a constant time interval $a$. (It should be emphasized that this applies only to a given speed value.) The ignition angle $z$ is determined by the interval value $a$ and the further value $b$, determined by the charges in the two pulse counters at the end of the interval $a$.

The speed-dependent charging of the first pulse counter 14 (see FIG. 4) occurs initially as per the run 70 until at point 71 a pulse number $s1$ is stored. This means that the engine is running no faster than a given speed value $n1$. (see FIG. 7) At point 71, in accordance with the dependence of the ignition angle $z$ on the speed $n$ a deviation from the linear curve occurs. In order to take into account this non-linearity, i.e., in order to represent the shape of the curve $z$ against $n$ in the diagram in FIG. 6, there now occurs the switching to another pulse frequency so that a charge curve 72, which in this example of an embodiment is steeper, results. This switching as a rule will occur several times so that the shape of $s$ within the interval $a$ represents a curve formed of straight line segments.

At the end of the interval $a$, i.e., when the second marking 6 becomes effective, the first pulse counter commences to count backward until the equality of the pulse numbers stored in the two pulse counters 14 and 15 is achieved. This backward counting is suggested in FIG. 6 by the branch of the curve 73. As soon as, in this case, such branch intersects with the line corresponding to the pulse number stored in the second pulse counter, the aforementioned condition for the generation of the ignition pulse is present so that it is produced offset from TDC by the advanced ignition angle $z$.

As shown by these observations, it is to be understood that non-linear dependence of the ignition angle on the rotational speed encompasses not only a continuous curve but also a curve showing a break. The application of the invention is not limited to reciprocating cylinder engines but is also possible for rotating combustion engines and whenever an ignition point is to be timed as a function of other parameters such as the rotational speed. Fundamentally, it is evidently also possible to take into account the load dependence continuously rather than in steps. Here again, an analog electric quantity, e.g., a voltage amplitude, can be delivered to an integrator, which amplitude is changed continuously or in steps as a function of the load. In order to obtain an electric quantity continuously modified as the load is modified, there be provided, e.g., a heated wire element in the suction pipe of the internal combustion engine whose resistance is modified as a function of the suction pressure and accordingly, becomes an indication of the mode of operation of the engine. Finally, simplifications of the circuits indicated as examples of embodiments of the invention are possible, e.g., such that the two counters are combined in one single counter selectively acted on, in case of a digital arrangement by both pulse sequences, by means of a switching circuit associated with it on the input side.

We claim:

1. In a method for speed-dependent control of the ignition angle of an internal combustion engine with external ignition, wherein an integrator for accumulating an electric quantity is controlled within a predetermined interval by an electric signal produced by markings on a rotating element of the engine and receiving elements associated with such markings, and from the integration result present at the end of the interval there is obtained an accurately timed ignition signal, the improvement comprising:

determining said predetermined interval with a constant angle interval extending between a first and a second marking on an engine part rotating relatively to another engine part; and modifying the rate of accumulating said electric quantity in said integrator speed-dependently according to a non-linear dependence of the ignition angle on the speed.

2. A method as in claim 1, wherein the integrator is controlled by an electric voltage, the amplitude of which is changed at predetermined speed values.

3. A method as in claim 1, wherein the integrator is a pulse counter and is controlled by a pulse sequence produced outside the engine whose frequency is modified on attainment of given pulse numbers within the angle interval.

4. A method as in claim 1, wherein the integration result is associated with a load-dependent signal, and the ignition signal is produced when the difference assumes a predetermined value.

5. A method as in claim 4, wherein following the termination of the angle interval, the integrator is discharged at a predetermined rate which is independent of the rotational speed, and the ignition signal is produced on equality of the storage value of the integrator with the load-dependent signal.

6. A method as in claim 4, wherein the load-dependent signal is modified in steps by a load sensor, each of which steps causes a change in the adjustment of the ignition angle by the same value.

7. A method as in claim 6 wherein a second integrator for accumulating an electric quantity is controlled in the angle interval by a second electric signal, and the rate of accumulating the electric quantity in the second integrator is modified by the load sensor; and the integration result from said second integrator at the end of the angle interval comprises said load dependent signal.

8. A method as in claim 7, wherein said second electric quantity comprises a voltage whose amplitude is changed at predetermined load values.

9. A method as in claim 7, wherein said second integrator is a second pulse counter and is controlled by a second pulse sequence produced outside the engine whose frequency is modified at predetermined load values within the angle interval.

10. An apparatus for controlling the ignition angle of an internal combustion engine comprising:
an internal combustion engine;
at least two proximity switches mounted on a member of the engine;
two markings placed on an element of the engine which rotates with respect to said member of said engine, said markings being angularly displaced from each other by an angle which defines an angle interval, the position of said markings on said element being defined relative to an operating phase of the engine;
said markings closely passing said switches when the engine is running in a time interval inversely proportional to the rotational speed of said element and thereby generating in said switches control signals;
a number of integrators controlled by said control signals, said number being determined by the number of different ignition points of the engine;
means for producing an electrical quantity;
means connecting said electrical quantity producing means to said integrators during said angle interval; and
means for modifying, as a non-linear function of engine speed, the rate at which said electrical quantity is accumulated in said integrators.

11. An apparatus as in claim 10, wherein the markings are formed on the rotating element by local modifications of the material of the element.

12. An apparatus as in claim 10, wherein the markings are provided on the flywheel of the engine.

13. An apparatus as in claim 12, wherein said switches are arranged on the gearbox flange side on the crankcase of the engine.

14. An apparatus as in claim 10, wherein said engine is a piston engine, and the two markings are arranged at 80° and 40°, respectively, before TDC relative to the switches.

15. An apparatus as in claim 10, wherein a third marking is provided to produce in said switches an emergency ignition signal in the event that an ignition signal is not produced by the other markings.

16. An apparatus as in claim 10, wherein an oscillator of constant frequency is connected a first network stepping up or stepping down the frequency of the pulses produced by the oscillator, said first network feeding a first pulse counter and also receiving from it switching signals in order to produce the frequency modifications when a predetermined pulse number is reached, said first pulse counter receiving pulses with a constant gating frequency after switching through the control signal produced by the second marking, for discharging the integration result at a predetermined rate.

17. An apparatus as in claim 16, wherein a second network is connected to the oscillator for stepping up or stepping down the frequency of the pulses produced by the oscillator, said second network receiving switching signals from said load sensor for producing the frequency modifications for predetermined load values, said second network being connected on the output side to a second pulse counter, both first and second pulse counters feeding a comparator circuit which produces the ignition signal whenever the integration result in the first pulse counter has been modified, by means of the pulses with the constant gating frequency, to a value which is a function of the load-dependent signal.

18. An apparatus as in claim 17, wherein the second marking causes switching of the first pulse counter to counting backwards, and the comparator circuit produces the ignition signal on equality of both pulse counter levels.

* * * * *

UNITED STATES PATENT AND TRADEMARK OFFICE
CERTIFICATE OF CORRECTION

PATENT NO. : 3,934,563

DATED : January 27, 1976

INVENTOR(S) : Rudolf Müller and Jürgen Decker

It is certified that error appears in the above-identified patent and that said Letters Patent are hereby corrected as shown below:

First page, Item [30], "2325497" should read --2325479--;
Col. 1, line 24, "reault" should read --result--;
Col. 2, line 62, "whhich" should read --which--;
Col. 5, line 1, delete "is":
Col. 6, line 36, after "5b" insert --, as--.

Signed and Sealed this eighth Day of June 1976

[SEAL]

Attest:

RUTH C. MASON
Attesting Officer

C. MARSHALL DANN
Commissioner of Patents and Trademarks